Patented Oct. 16, 1951

2,571,693

UNITED STATES PATENT OFFICE 2,571,693

PROCESS FOR PRODUCTION OF STREPTOMYCIN

Eugene L. Dulaney, Rahway, N. J., assignor to Merck & Co., Inc., Rahway, N. J., a corporation of New Jersey No Drawing. Application July 25, 1950,
Serial No. 175,891

1 Claim. (Cl. 195—80)

This invention relates to the production of streptomycin, and more particularly, to procedures for obtaining streptomycin in enhanced yield by the utilization of the new and distinct culture of *Streptomyces griseus* hereinafter described and characterized.

In my pending application, Serial No. 8,308, now U. S. Patent 2,545,572, filed February 14, 1948, I have disclosed procedures for producing streptomycin in yields of the order of 800 to 1100 mcg./ml. by means of the new and distinct culture S. *griseus* Dulaney L-118. This culture was obtained by subjecting spores of a strain of S. *griseus* characterized as resistant to an initial streptomycin concentration of at least 500 mcg./ml. to the action of ultra-violet light, allowing the spores surviving such treatment to grow and selecting from the resulting colonies of S. *griseus* those exhibiting an increased ability to produce streptomycin, again subjecting spores from the selected colonies to the action of ultraviolet light and repeating the colony development, selection, and spore irradiation until a mutated strain of S. *griseus* was obtained which possessed the capacity of consistently producing streptomycin in yields of at least 800 mcg./ml.

While the streptomycin yields of 800 to 1100 mcg./ml. produced by the culture S. *griseus* Dulaney L-118 are markedly superior to yields obtainable with strains of S. *griseus* previously available, I have now discovered that yields of streptomycin can be further increased to about 1800 to 2200 mcg./ml. by utilizing the new and distinct culture hereinafter designated as S. *griseus*, albus mutant (Dulaney Z-38). This new culture or mutant was obtained by subjecting spores of S. *griseus* Dulaney L-118 to the mutating action of ultra-violet light and soft X-rays. The experimental procedure leading to the isolation of the new mutant was as follows:

Spores of S. *griseus* Dulaney L-118 were washed from a surface growth with sterile distilled water, and the resulting spore suspension was filtered through several layers of sterile absorbent cotton. The filtered spore suspension was then exposed to ultra-violet light having a wave length of 2,537 Å for sufficient time, about 2 minutes, to kill approximately 99% of the spores. The treated cell suspension was then diluted with distilled water, and a quantity of the diluted suspension was spread over Petri dish plates of nutrient agar, i.e., an aqueous medium containing 2.5% glucose, 4.0% soybean meal, 0.25% sodium chloride, 0.5% distillers solubles and solidified with agar. After incubation until good growth and sporulation occurred, the colonies were transferred to agar slants of the same medium, and, after incubation until good growth and sporulation occurred, sterile water was added to each of the slants, and separate spore suspensions were prepared from each slant.

Quantities of each spore suspension were transferred to flasks containing an inoculum medium composed of 1% glucose, 1% enzymatic digest of casein, 1% sodium chloride, 0.6% meat extract, and distilled water to volume. The inoculated flasks were then incubated with constant agitation for 48 hours, and the vegetative growth which developed was used to inoculate flasks of aqueous fermentation medium having the composition: 2.5% glucose, 4.0% soybean meal, 0.25% sodium chloride and 0.5% distillers solubles. These inoculated flasks were then incubated at 28° C. with constant agitation for 4 to 5 days to permit maximum streptomycin production.

The foregoing mutation and selection procedures were repeated with additional spore suspensions of S. *griseus* Dulaney L-118 until a superior streptomycin producing mutant was obtained as evidenced by an enhanced yield of streptomycin in the fermentation flask.

A spore suspension in distilled water of this superior mutant which was designated O-3 was exposed to soft X-rays until approximately 99% of the spores were killed. This treated suspension was diluted with distilled water, plated on nutrient agar for spore development, and the resulting spores were used to inoculate flasks of inoculum medium and flasks of fermentation medium in accordance with the procedure above-described.

A new and higher yielding mutant thus obtained from O-3 was designated R-315. Spores of the mutant R-315 were similarly treated with X-rays, and from the cultures thus obtained mutant T-535 was selected as a parent for further mutation work. Spores of mutant T-535 were treated with ultra-violet light and mutant V-148 was selected from the resulting cultures. One of the natural isolates of mutant V-148, i. e., strain X-69, was found to be a superior streptomycin producer and was, in turn, treated with ultra-violet light yielding the superior mutant Z-38, more fully hereinafter referred to as S. *griseus*, albus mutant (Dulaney Z-38). The following diagram illustrates the genealogy of strain Z-38.

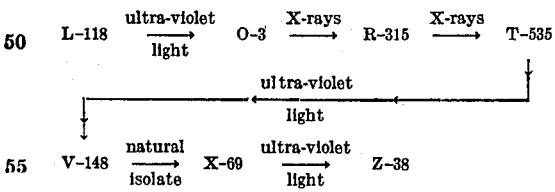

Comparative morphological properties and biochemical reactions as given in Bergey's Manual of Determinative Bacteriology and as observed for S. *griseus* Dulaney L-118 and S.

*griseus*, albus mutant (Dulaney Z-38) are tabulated below:

The following examples are presented to illustrate procedures for the production of strepto-

CULTURAL CHARACTERISTICS OF *S. GRISEUS*

| | Bergey's Manual of Determinative Bacteriology | *S. griseus* L-118 | *S. griseus* Z-38 |
|---|---|---|---|
| Filaments | Branching, a few spirals | Straight, branching, no spirals | Straight, branching, occasional spirals. |
| Conidia | Rod-shaped to short cylindrical 0.8 x 0.8 to 1.7 microns | Agrees | Agrees. |
| Gelatin stab | Greenish-yellow or cream-colored surface growth, brownish tinge, rapid liquefaction. | 16 days—50% of medium liquefied (color not recorded). | 16 days—25% of medium liquefied (color not recorded). |
| Synthetic Agar | Thin, colorless, spreading, olive buff-aerial mycelium thick, powder, water-green. | Colorless growth no aerial mycelium. | Colorless growth no aerial mycelium. |
| Starch Agar | Thin spreading, Transparent | Thin, spreading, not transparent, cream growth, starch hydrolyzed. | Thin, spreading, not transparent, cream growth, starch hydrolyzed. |
| Dextrose Agar | Elevated in center, radiate cream-colored to orange, erose margin. | Faint growth-spreading, colorless. | Faint growth-spreading, colorless. |
| Plain Agar | Abundant, cream-colored, almost transparent. | Colorless, transparent growth | Colorless, transparent growth. |
| Dextrose broth | Abundant, yellowish pellicle with greenish tinge, much folded. | Pellicle (color and type not observed). | Pellicle (Color and type not observed). |
| Litmus milk | Cream colored ring, coagulated with rapid peptonization, becoming alkaline. | Peptonized (pH of substrate, and color and type of surface growth not observed). | Peptonized (pH of substrate, and color and type of surface growth not observed). |
| Potato | Yellowish, wrinkled | Heavy growth, grey; rugose; potato darkening. | Heavy growth, tan; rugose; potato darkening. |
| Reduction | Nitrites produced from nitrates | Nitrites produced | Nitrites produced. |
| Pigment | Not soluble | Not soluble | Not soluble. |
| Oxygen tension | Aerobic | Aerobic | Aerobic. |

Additional typing tests not listed by Bergey gave the following results:

| Test | *S. griseus* L-118 | *S. griseus* Z-38 |
|---|---|---|
| Cellulose decomposition | No decomposition | No decomposition. |
| Ca malate agar | Faint growth | Faint growth. |
| Tyrosine agar | No apparent growth | No apparent growth. |
| Phosphate agar | Spore-bearing hyphae in clusters. | Vegetative mycelium. |
| Soybean agar (Composition, see page 2, lines 22–24). | Abundant sporulation, grey to grey-green spores. | Abundant sporulation, spores white. |
| 1% Yeast extract, 0.5% glucose agar. | Abundant sporulation. | No sporulation. |
| Spore inoculum [1] on Difco Yeast Beef Agar (No. B244).[2] | Light sporulation [4] | Practically no sporulation.[4] |
| Vegetative inoculum [3] on Difco Yeast Beef Agar (No. B244). | About 80% of colonies show sporulation.[5] | Less than 1% of colonies show sporulation.[5] |

[1] Spores from agar Blake bottle suspended in distilled water as previously described.

[2] The composition of Difco Yeast Beef Agar (No. B244) is as follows:

| Ingredient | Grams per 100 cc. of aqueous medium |
|---|---|
| Bacto Beef Extract | 0.15 |
| Bacto Yeast Extract | 0.3 |
| Bacto Peptone | 0.6 |
| Bacto Dextrose | 0.1 |
| Bacto Agar | 1.5 |

NOTE: To this medium was added 1 gram per 100 cc. of Difco dehydrated agar to yield a firmer solidified medium.

[3] Vegetative inoculum was prepared by inoculating 40 cc. of a sterile liquid medium described below, in a cotton plugged 250 cc. Erlenmeyer flask and incubating at 27° C. for 20 hours on a rotary shaker.
The medium used for vegetative inoculum development had the following composition:

| Ingredient | Grams per 100 cc. of aqueous medium |
|---|---|
| N-Z-Amine (enzyme hydrolyzed casein) | 1.0 |
| Dextrose | 1.0 |
| Beef Extract | 0.3 |

[4] In inoculating with spores, spores from a Blake bottle culture were suspended in sterile water at a sufficient dilution so that when loop streaked on the test medium, and incubated at 27° C. for about 6 days, separate colonies developed and were examined individually for sporulation.

[5] A loop of the vegetative inoculum, prepared as described in note (3) above, was streaked on the test medium. Dilution was such that, after incubation of the test plate for about 6 days at 27° C., separate colonies developed and were examined individually for sporulation.

mycin using the new culture *S. griseus*, albus mutant (Dulaney Z-38).

EXAMPLE 1

Spores from nutrient agar slants of the *S. griseus* strains L-118, X-69 and Z-38 previously referred to were used to inoculate separate flasks containing the following nutrient medium: 1% glucose, 1% enzymatic digest of casein, 1% sodium chloride, 0.6% meat extract and distilled water to volume. The flasks containing the inoculated medium were incubated on a rotary shaker at 28° C. until good growth occurred. After 48 hours incubation, this vegetative growth was used to inoculate 250 ml. Erlenmeyer flasks containing 40 ml. of the following medium:

| | |
|---|---|
| Glucose _____per cent__ | 2.5 |
| Soybean meal _____do____ | 4.0 |
| Sodium chloride _____do____ | 0.25 |
| Distillers dried solubles _____do____ | 0.5 |
| Distilled water _____to volume | |
| pH before sterilization _____ | 7.38 |

The flasks containing the inoculated medium were incubated on a rotary shaker, 220 R. P. M., at 28° C. until maximum streptomycin production, as measured by the *Bacillus subtilus* cup assay, occurred. The results of the comparative experiment are given in the following table:

| Strain No. | Streptomycin broth potency $\gamma$ ml. after | |
|---|---|---|
| | 4 days | 5 days |
| L-118 | [1] 670 | [1] 635 |
| X-69 | 860 | 1,480 |
| Z-38 | 1,205 | 2,000 |

[1] Streptomycin yield is low for strain L-118 due to the fact that the incubation temperature is higher than the optimum value for strain L-118.

EXAMPLE 2

A 5-liter fermentor was charged with 3.2 liters of a medium containing 4% soybean meal, 0.25% sodium chloride, 0.5% distillers solubles, 2.5% dextrose and distilled water to volume. Approximately 0.5 P. P. M. of cobalt as cobalt nitrate was also added to the medium, and the medium, after sterilization, was inoculated with 5% of a vegetative culture of *S. griseus*, albus mutant (Z-38). Another 5-liter fermentor was charged with 3.2 liters of a medium containing 3% soybean meal, 2% dextrose, 0.75% distillers solubles, 0.25% sodium chloride, distilled water to volume and 0.5 P. P. M. of cobalt as cobalt nitrate. This medium, after sterilization, was inoculated with 5% of a vegetative culture of *S. griseus* Dulaney L-118. The two inoculated mediums were incubated at 27° C. with mechanical agitation and aeration until maximum streptomycin production was obtained in each. At the end of the fermentation, the following yields of streptomycin and vitamin $B_{12}$ were obtained:

| Inoculum | Streptomycin | | $B_{12}$ color isolated based on 1000 gal. volume, mg. |
|---|---|---|---|
| | Maximum mcg./ml. | Time of maximum hours | |
| L-118 | 1,140 | [2] 113 | 950 |
| Z-38 | [1] 1,830 | [2] 118 | 0 |

[1] The streptomycin yield with strain Z-38 would have been somewhat higher if the optimum temperature of 28.5° C. had been employed in this experiment.
[2] In 15,000 gal. fermentors the time for maximum streptomycin production is 80 hours for L-118 and 110 hours for Z-38.

EXAMPLE 3

An inoculum was prepared by propagating spores of *S. griseus*, albus mutant (Dulaney Z-38) in a sterile medium containing 1% dextrose, 1% enzymatic digest of casein, 0.6% meat extract and distilled water to volume, under aerated and agitated conditions at 27° C. for 36 to 48 hours until good growth was obtained. One ml. portions of the resulting broth were used to inoculate each of a number of flasks containing the medium above-described, and these cultures were allowed to grow at 27° C. under aerated and agitated conditions for 20 to 24 hours until approximately 5-7 mg./ml. of vegetative growth (dry weight) was obtained and 3-4 mg./ml. of sugar remained. The contents of the flasks were then pooled to provide inoculum for actual streptomycin production.

A number of 5-liter fermentors were charged with 3200 ml. portions of sterile medium containing 3.5% of soybean meal, 2.75% dextrose, 0.5% distillers dried solubles, 0.25% sodium chloride, 0.4 cc. per 100 cc. of soybean oil and distilled water to volume, which is the preferred medium for Z-38. Each of the fermentors was inoculated with 150 ml. of the prepared inoculum and incubated at a temperature of 28.5° C. for 112 to 118 hours with mechanical agitation, imparted by an impeller bearing rotary shaft, and aeration under varying conditions. The streptomycin yields obtained with the different conditions of agitation and aeration are tabulated below, the streptomycin yield in each instance being an average of values obtained in 3 or more separate fermentors.

*Effect of power on streptomycin production with Z-38*

| Total Power Absorbed, HP/gal. of aerated fermenting medium | Superficial Air Velocity, ft./hr. | Streptomycin Yield, mcg./ml. of fermented broths |
|---|---|---|
| .0024 | 72 | 938.5 |
| .0049 | 36 | 1,656 |
| .0072 | 36 | 1,726 |
| .0091 | 36 | 1,919 |
| .0096 | 36 | 2,051 |
| .0230 | 36 | 2,077 |

In comparison, a similar experiment was performed in the same 5-liter fermentors in which vegetative inoculum of culture L-118 was used for fermentation at 27° C. of the following sterile preferred medium: soybean meal 3.0%; dextrose 2.0%, distillers dried solubles 0.75% and sodium chloride 0.25%. Results obtained were as follows:

| Total Power Absorbed, HP/gal. of aerated fermenting medium | Superficial Air Velocity, ft./hr. | Streptomycin Yield, mcg./ml. of fermented broths |
|---|---|---|
| 0.0012 | 36 | 350 |
| 0.0015 | 36 | 780 |
| 0.0024 | 36 | 1,000 |
| 0.0920 | 36 | 980 |

As will be noted from the above tables, increasing the horsepower absorbed per gallon of fermenting medium of 0.0024 with culture L-118 does not increase streptomycin yield above 1000 mcg./ml. of fermented broth, whereas, with the Z-38 culture such increase in horse power absorbed up to 0.009 horse power per gallon of fermented medium raises the streptomycin yield up to 2000 mcg./ml. of fermenting broth.

EXAMPLE 4

The procedure of preparing an inoculum of *S. griseus*, albus mutant (Dulaney Z-38) and using this inoculum to inoculate 3200 ml. portions of medium in a number of 5-liter fermentors was repeated as described in Example 3. The inoculated mediums were then incubated at the different temperatures as indicated with constant mechanical agitation and aeration until maximum streptomycin production was obtained. Agitation in each instance was supplied by means of 2 turbo impellers revolving at such a rate that the total power absorbed was 0.0091 HP./gal. The streptomycin yield at the different incubation temperatures employed is indicated in the following tabulation, the values in each instance representing an average of two or more separate fermentations.

| Temperature, °C. | Streptomycin Yield, mcg./ml. | Time for Maximum Streptomycin Yield, hours |
|---|---|---|
| 25 | 1,180 | 118 |
| 27 | 2,041 | 118 |
| 29 | 2,194 | 104 |
| 31 | 414 | 72 |

Additional experiments have indicated that the optimum incubation temperature with the organism *S. griseus*, albus mutant (Dulaney Z-38) is 28.5° C.

EXAMPLE 5

The procedure of preparing an inoculum of *S. griseus* albus mutant (Dulaney Z-38) and using this inoculum to inoculate 3200 ml. portions of medium in a number of 5-liter fermentors was repeated as described in Example 3. The mediums prior to inoculation were each adjusted to predetermined pH values by addition of caustic, i. e., sodium hydroxide solution, either before sterilization or after sterilization as indicated. The inoculated mediums were then incubated at a temperature of 28.5° C. with constant mechanical agitation and aeration until maximum streptomycin production was obtained, the agitation in each instance being provided by two turbo impellers revolving at such a rate that the total power absorbed was 0.0091 HP./gal. The fermentations were conducted as two separate experiments, one to determine the comparative effectiveness of pH adjustment before and after sterilization, and the other to determine the optimum pH adjustment before sterilization. The streptomycin yields obtained in these experiments are tabulated below, the values in each instance representing an average of two or more separate fermentations.

*Effect of pH adjustment before and after sterilization*

| Initial pH of Sample | pH Adjustment | Time for Maximum Streptomycin Yield, hours | Streptomycin Yield, mcg./ml. |
|---|---|---|---|
| 6.6 | 7.0 before sterilization | 112 | 1,769 |
| 6.8 | 7.0 after sterilization | 118 | 1,555 |
| 6.4 | 6.5 after sterilization | 104 | 1,378 |
| 6.2 | 6.0 after sterilization | 104 | 1,266 |

*Effect of different pH adjustment before and after sterilization*

| Initial pH of Sample | pH adjustment ml. 30% NaOH added before sterilization | Time for Maximum Streptomycin Yield, hours | Streptomycin Yield mcg./ml. |
|---|---|---|---|
| 6.65 | 3.2 (pH approx. 7.0) | 112 | 1,913 |
| 6.33 | 2.2 (pH less than 7.0) | 118 | 1,859 |
| 6.5 | 4.2 (pH greater than 7.0) | 96 | 1,799 |

From the foregoing tabulations, it is evident that better results are obtained when the pH is adjusted prior to sterilization and that optimum results are obtained when the pH is adjusted to approximately 7.0 prior to sterilization.

From the foregoing examples, it is evident that the following criteria, in addition to the typing test results already set forth, can be used to distinguish *S. griseus*, albus mutant (Dulaney Z-38) from its parent *S. griseus* Dulaney L-118:

| | Z-38 | L-118 |
|---|---|---|
| Optimum fermentation temperature | 28.5° C | 27° C. |
| Fermentation time for maximum streptomycin production | 110 hours | 80 hours. |
| Optimum pH of medium: | | |
| Before sterilization | 7.0 | 6.2-6.4. |
| After sterilization | 6.5-6.6 | 6.1-6.3. |
| Minimum agitation power absorption for maximum streptomycin production HP/gal. fermenting aerated medium. | 0.009 | 0.0024. |
| Approximate maximum yield of streptomycin—mcg. of streptomycin per ml. of fermented broth. | 2,000 | 1,000. |
| Vitamin B$^{12}$ potency of fermented broth. | none | 950 mg. per 1,000 gal. of broth. |

Various changes and modifications may be made in carrying out the present invention without departing from the spirit and scope thereof. Insofar as these changes and modifications are within the purview of the annexed claim, they are to be considered as part of my invention.

I claim:

The process for the production of streptomycin that comprises fermenting an aqueous nutrient medium under submerged aerated and mechanically agitated conditions by means of the herein described organism *Streptomyces griseus*, albus mutant (Dulaney Z-38).

EUGENE L. DULANEY.

REFERENCES CITED

The following references are of record in the file of this patent:

UNITED STATES PATENTS

| Number | Name | Date |
|---|---|---|
| 2,445,748 | Demerec | July 27, 1948 |